United States Patent [19]

Pradel et al.

[11] Patent Number: 5,580,079
[45] Date of Patent: *Dec. 3, 1996

[54] ROTARY ACTUATOR WITH STABILIZER IN A MOTOR VEHICLE SUSPENSION SYSTEM

[75] Inventors: Robert Pradel, Röthlein; Stefan Schiffler, Schonungen, both of Germany

[73] Assignee: Fichtel & Sachs AG, Schweinfurt, Germany

[*] Notice: The term of this patent shall not extend beyond the expiration date of Pat. No. 5,573,265.

[21] Appl. No.: 330,908

[22] Filed: Oct. 28, 1994

[30]  Foreign Application Priority Data

Nov. 5, 1993 [DE] Germany ............................ 43 37 821.8

[51] Int. Cl.$^6$ ................................................. B60G 11/18
[52] U.S. Cl. .............................................. 280/723; 267/277
[58] Field of Search ................................ 280/689, 723; 267/277, 276

[56]  References Cited

U.S. PATENT DOCUMENTS 3,197,233  7/1965  Van Winsen et al. .................. 280/723
4,962,943  10/1990  Lin .......................................... 280/723

FOREIGN PATENT DOCUMENTS 0248986  12/1987  European Pat. Off. .
428439  5/1991  European Pat. Off. ............... 280/723
7038443  1/1971  Germany .
639611  5/1962  Italy ....................................... 280/723
3-186424  8/1991  Japan .................................... 280/723

OTHER PUBLICATIONS

Article "Auto und Verkehr", 1992.

*Primary Examiner*—Paul N. Dickson
*Attorney, Agent, or Firm*—Nils H. Ljungman & Associates

[57]  ABSTRACT

A hydraulic rotary actuator within a stabilizer system divided into two parts is taught. A first stabilizer part is non-rotationally connected to a rotary actuator vane assembly, and a second stabilizer part is non-rotationally connected to a rotary actuator housing. The rotary actuator housing has hydraulic connections for hydraulic lines which form a flow connection to a hydraulic system. The two stabilizer parts can be rotated with respect to one another by the rotary actuator. The segments of the hydraulic lines which are connected to the rotary actuator, and are subject to possible deformation, are located in a plane which lies essentially perpendicular to the axis of rotation of the rotary actuator.

15 Claims, 8 Drawing Sheets

ROTARY ACTUATOR WITH STABILIZER IN A MOTOR VEHICLE SUSPENSION SYSTEM

BACKGROUND OF THE INVENTION

1. Field of the Invention

The invention relates to a rotary actuator in a motor vehicle suspension system.

2. Background Information

The technical journal "Auto und Verkehr" 18/1992 discloses an active stabilizer system for the reduction of the rolling motion of motor vehicles. A two-piece stabilizer system with a rotary actuator is used for this purpose, whereby a stabilizer part is non-rotationally connected to a rotary actuator housing. The rotary actuator has a number of hydraulic connections which are connected by means of hydraulic lines to a hydraulic valve in a hydraulic system. The hydraulic valve is permanently installed in the vehicle. The two components of the rotary actuator, together with respective stabilizer parts, rotate relative to one another, and also relative to the hydraulic valve. The relative motion can generally be considered to be caused by the spring-mounted wheels with which the stabilizer is engaged.

With known rotary actuator designs, a bending-torsional load is applied to the hydraulic lines which are subject to deformation as a result of the movements of the stabilizer, since the hydraulic valve does not move in conjunction with the rotary actuator. The bending-torsional load leads to rapid material fatigue which, in the worst case can result in a loss of hydraulic fluid.

OBJECT OF THE INVENTION

The object of the current invention is to eliminate the disadvantage described above using extremely simple means.

SUMMARY OF THE INVENTION

As a result of advantageous placement, the hydraulic lines can generally be subjected to only a bending load. These bending loads can easily be withstood by hydraulic lines of the known arrangements.

The location of the hydraulic connections on the outside surface of the rotary actuator housing makes it possible to locate the hydraulic connections in a plane essentially perpendicular to an axis through the rotary actuator. Care must be taken that the hydraulic lines are preferably the shortest possible distance from the hydraulic valve to limit the deformation of the hydraulic lines to a minimum.

In an alternative solution, the hydraulic connections can be designed as angular connections and can be located on the end surface of the rotary actuator housing. The angular connections in turn generally provide the desired position of the hydraulic lines. In this case, too, only bending loads occur. It can be particularly advantageous if the angular connections are designed so that they can rotate inside the rotary actuator housing. Consequently, the load on the hydraulic lines can be reduced to a minimum. In a further embodiment of the present invention, the angular connection can preferably be formed by a sleeve element of the hydraulic line, which sleeve element can preferably have bearing surfaces which interact with guide surfaces on the housing, and at least one seal unit, whereby an axial fixing of the hydraulic line can generally provide support against tensile loads.

In another possible embodiment of the present invention, a hose fastener can be fastened as desired to either the rotary actuator housing or to a stabilizer part which is stationary relative to the rotary actuator. This fastener, by means of a mounting device, can preferably divide the hydraulic lines into a stationary and a mobile line segment, whereby the mobile line segment is preferably in a plane which is essentially perpendicular to the axis of rotation of the rotary actuator. This embodiment generally requires no rotating hydraulic connections and can advantageously be retrofitted to existing designs. According to one advantageous feature, the hose fastener can be formed by a double pipe clip whose individual clips are essentially oriented at right angles to one another.

It should be understood that when the word "invention" is used in this application, the word "invention" includes "inventions," that is, the plural of "invention." By stating "invention," applicant does not in any way admit that the present application does not include more than one patentably and non-obviously distinct invention, and maintains the possibility that this application may include more than one patentably and non-obviously distinct invention. The applicant hereby asserts that the disclosure of this application may include more than one invention, and, in the event that there is more than one invention, that these inventions may be patentable and non-obvious, one with respect to the other.

One aspect of the invention resides broadly in an automobile suspension system comprising: a hydraulic rotary actuator; the rotary actuator comprising a first member and a second member; at least one of the first member and the second member being rotatable with respect to the other; apparatus for rotating, with hydraulic fluid pressure, at least one of the first member and the second member with respect to the other; at least one of the first member and the second member being rotatable about an axis of rotation; a first stabilizer bar; a second stabilizer bar; the first stabilizer bar being attached to the first member; the second stabilizer bar being attached to the second member; apparatus for connecting hydraulic lines to one of the first member and the second member; and the apparatus for connecting comprising apparatus for minimizing twisting, during actuation of the rotary actuator, of hydraulic lines along the length of hydraulic lines being connected to one of the first member and the second member.

BRIEF DESCRIPTION OF THE DRAWINGS

The present invention and its advantages are described in greater detail below with reference to the accompanying drawings, in which.

DESCRIPTION OF THE PREFERRED EMBODIMENT

Figure 1:
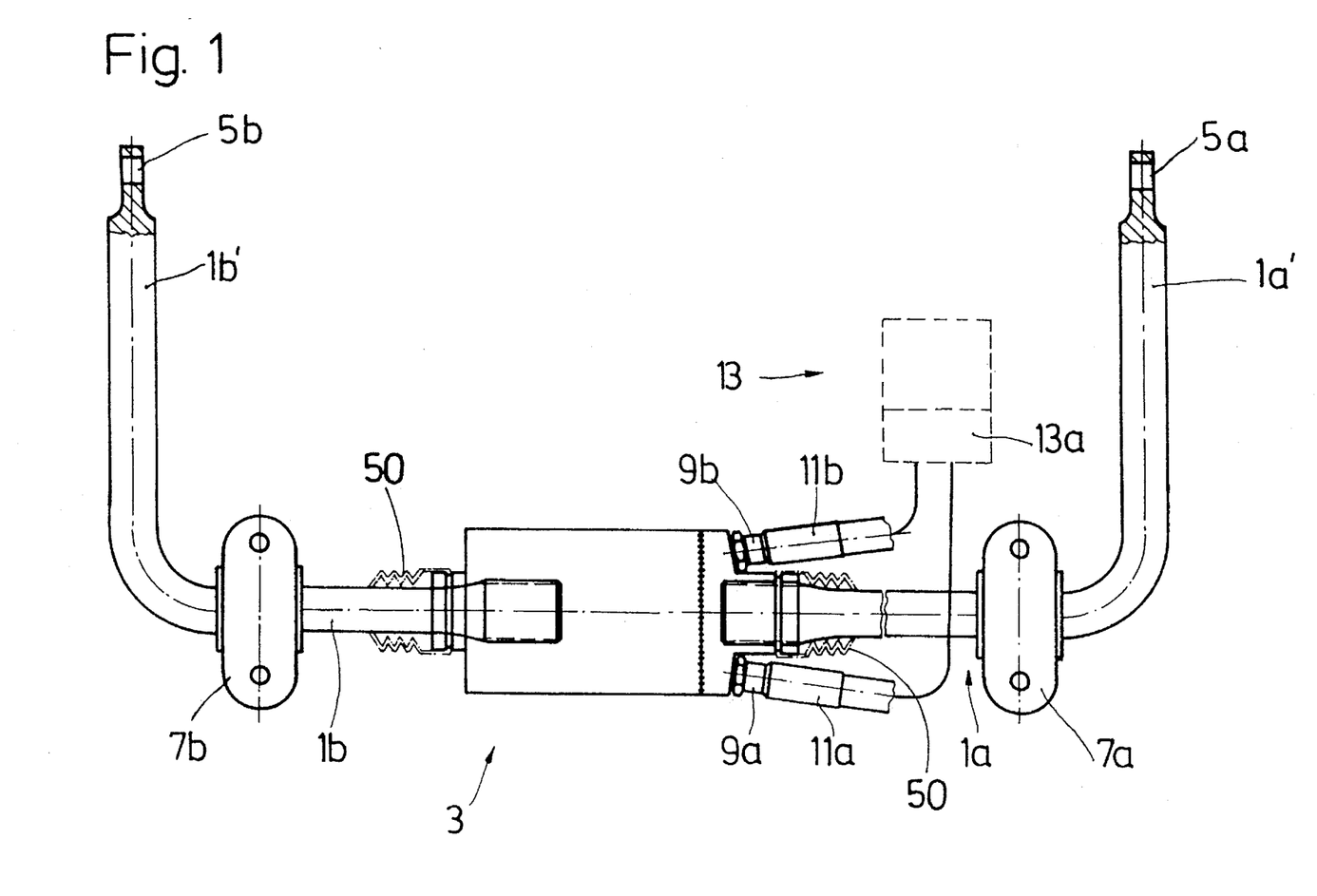
FIG. 1 schematically illustrates a complete stabilizer system.

FIG. 1 represents a stabilizer 1a, 1b with a rotary actuator 3. On the angled ends 1a' 1b' there preferably are locators 5a, 5b in which wheel bearings of a motor vehicle (not shown in the figure, for purposes of simplicity) can be engaged by means which are generally known and therefore not discussed in any further detail herein. The stabilizer 1a, 1b is preferably fastened to the vehicle by means of articulated clips 7a, 7b.

Figure 2A:
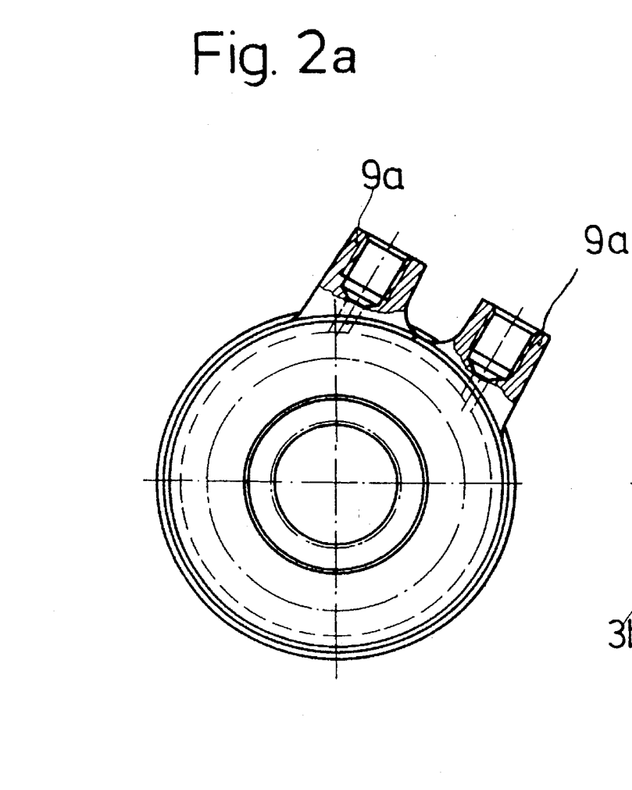
FIGS. 2a and 2b schematically illustrate a rotary actuator with hydraulic connections on the outside.
Figure 2B:
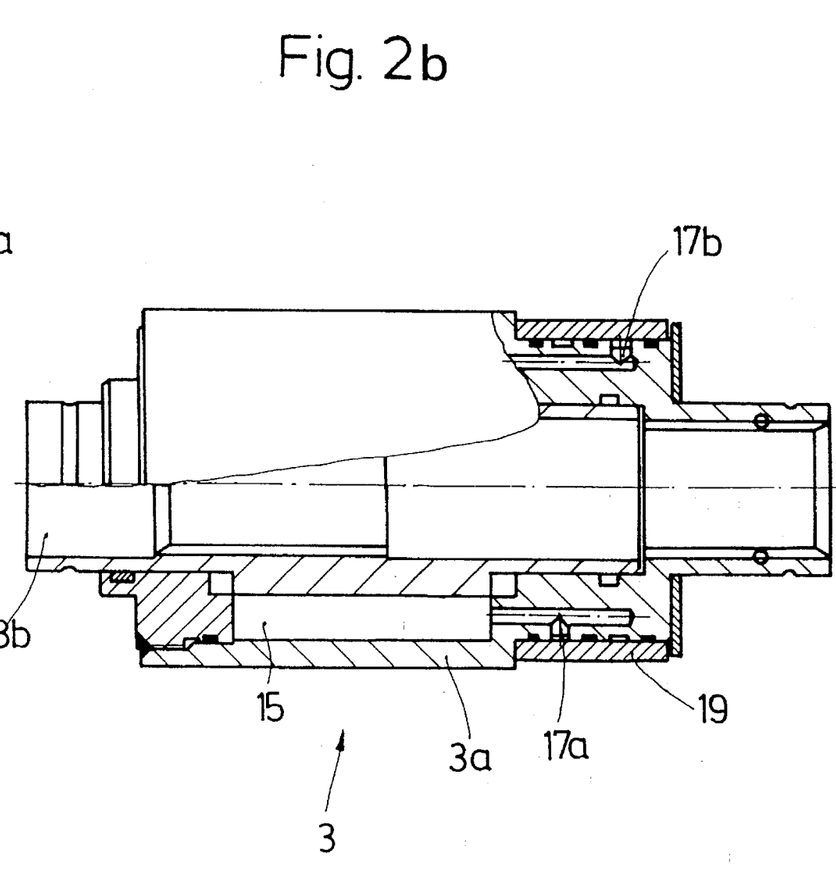

The rotary actuator 3 can preferably have a rotary actuator housing 3a and a rotary actuator vane assembly 3b (shown in FIG. 2b). The rotary actuator housing 3a can preferably be non-rotationally connected to the stabilizer part 1a, and the rotary actuator vane assembly 3b can preferably be non-rotationally connected to the stabilizer part 1b. In the event of uneven deflection of the vehicle springs, the rotary actuator 3 can be rotated by means of the angled ends 1a', 1b', whereby wheel contact forces can interact with the angled ends 1a', 1b' to exert a torsional moment on the stabilizer 1a, 1b The rotary actuator 3 preferably has two hydraulic connections 9a, 9b which form a connection to a hydraulic system 13 via the hydraulic lines 11a, 11b. The hydraulic system 13 preferably includes at least a hydraulic valve 13a. The hydraulic system 13 and hydraulic valve 13a are generally considered to be well known and are, therefore, not discussed in a further detail herein. The components of the hydraulic system 13 can be permanently installed in the vehicle so that with each deflection of the vehicle springs or stabilizer 1a, 1b movement, there can be a relative movement of the hydraulic lines 11a, 11b with respect to the hydraulic system 13. This movement preferably must be compensated for by the hydraulic hoses forming the hydraulic lines 11a, 11b together with the hydraulic connections 9a, 9b.

FIG. 1 shows bellow sleeves 50 protecting the connection between the stabilizer part 1a and the rotary actuator 3 and the connection between the stabilizer part 1b and the rotary actuator 3.

Figure 2C:
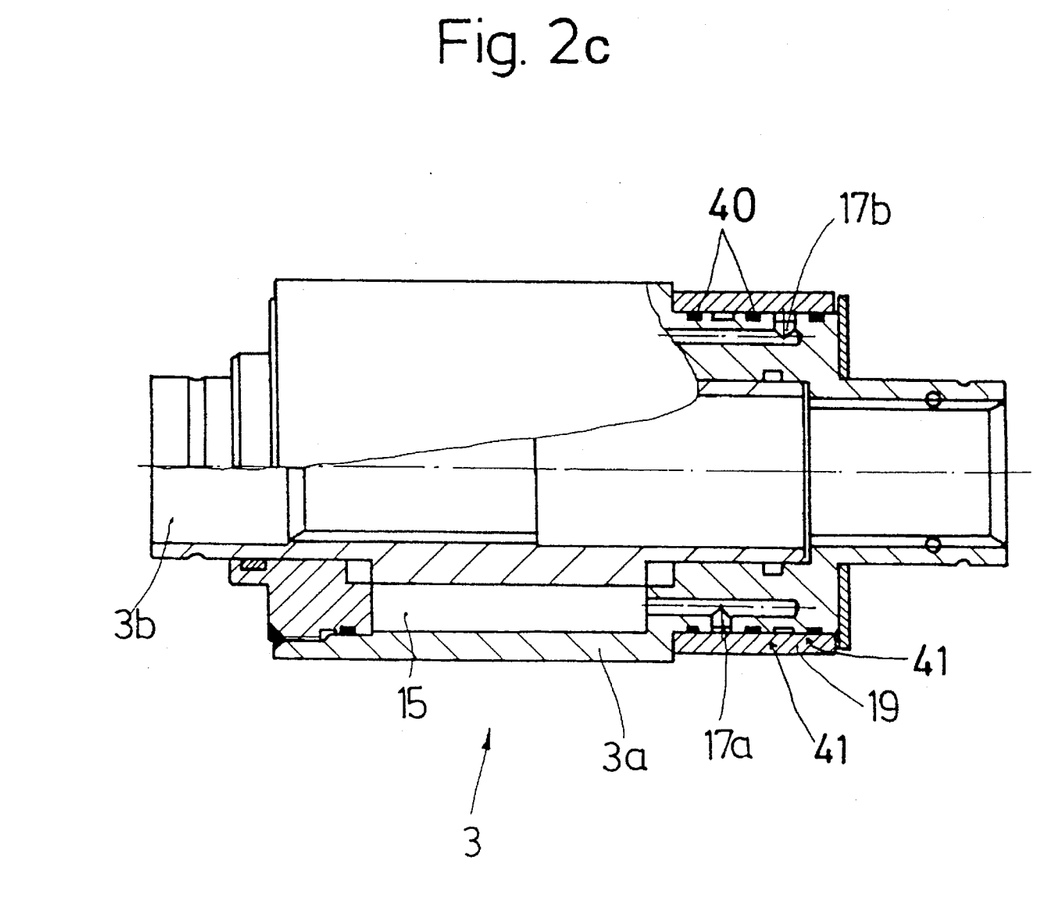
FIG. 2c represents a further embodiment of FIG. 2b.

FIGS. 2a, 2b and 2c are restricted to the rotary actuator 3. The rotary actuator vane assembly 3b, together with the rotary actuator housing 3a, preferably forms pressure chambers 15 therebetween. The pressure chamber 15 can be alternately filled with hydraulic medium via a separate system of passages 17a, 17b or emptied by means of a rotary movement of the rotary actuator housing 3a relative to the rotary actuator vane assembly 3b. Each of these passage systems 17a, 17b is preferably connected to a hydraulic connection 9a, 9b which, in this embodiment of the rotary actuator 3, are preferably located on the outside of the rotary actuator housing 3a and are disposed radially to the rotary actuator 3. The connection of the hydraulic connections 9a, 9b is preferably by means of a ring-type nipple 19, which can turn with respect to the rotary actuator housing 3a, whereby the hydraulic connections 9a, 9b are preferably offset relative to the longitudinal axis of the rotary actuator 3. With such an offset the hydraulic connections 9a, 9b would preferably never come in contact with one another during rotational movement of the ring-type nipple 19.

The offset in the embodiment discussed above can be considered to be radial with respect to the longitudinal axis. In an additional embodiment, the offset may be axial with respect to the longitudinal axis. The offset may result in a variety of combinations of circumferential positions of the hydraulic connection 9a, 9b with respect to the longitudinal axis.

With the rotational movement of the two rotary actuator components 3a, 3b during operation, the ring-type nipple 19 with its hydraulic connections 9a, 9b via the hydraulic lines 11a, 11b preferably remains in an unchanged position relative to the hydraulic valve 13a, since the ring-type nipple 19 preferably rotates with respect to the rotary actuator housing 3a by the same amount by which the rotary actuator housing 3a rotates relative to the vehicle chassis. Thus generally minimal torsional forces, and typically no torsional forces at all, are exerted on the hydraulic lines 11a, 11b. Even rigid tubes could be used for the hydraulic lines 11a, 11b.

FIG. 2c illustrates a further embodiment of the present invention. Seals 40 can be located between the rotary actuator housing 3a and the ring-type nipple connector 19 to prevent the leakage of hydraulic fluid during operation of the rotary actuator 3. The seals 40 and bushings 41 prevent the ring-type nipple connector 19 from becoming disconnected from the rotary actuator housing 3a during operation of the rotary actuator 3.

Figure 3A:
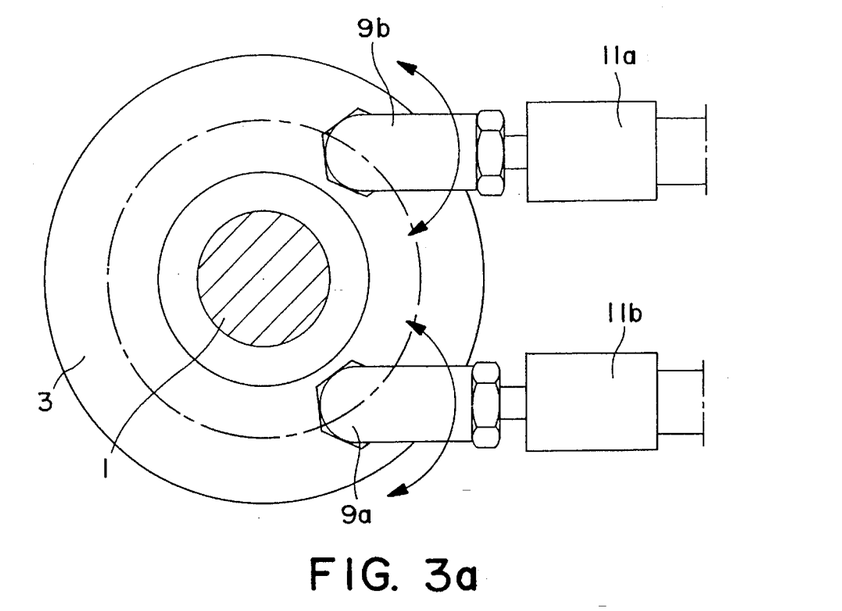
FIGS. 3a and 3b schematically illustrate a rotary actuator with angular connections.
Figure 3B:
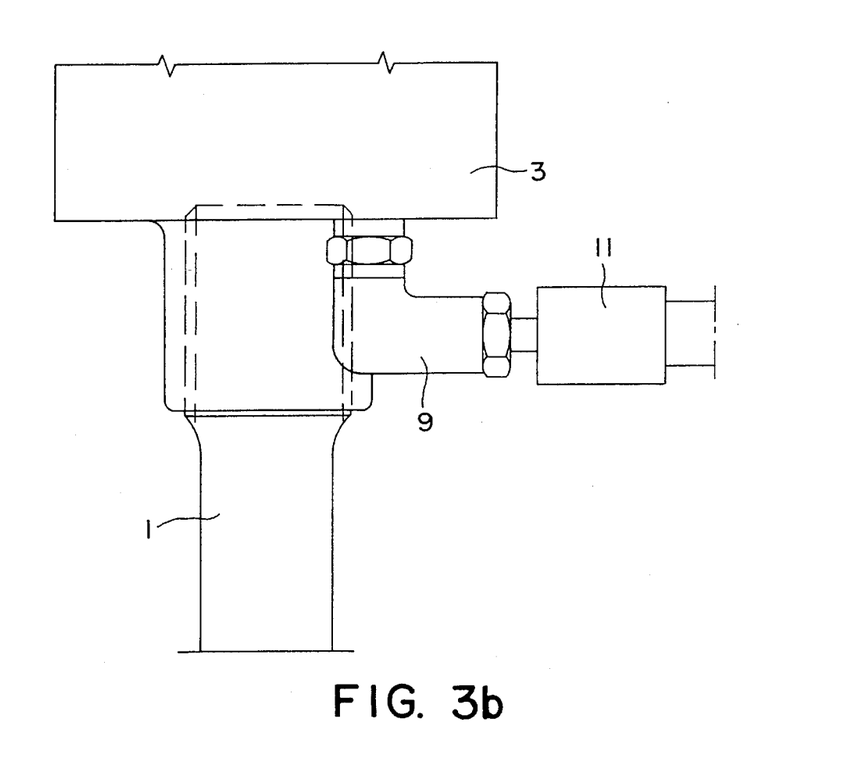

FIGS. 3a and 3b show alternative embodiments with the possibility of separate rotational connections 9, 9a, 9b that can be elbow connections, preferably 90-degree elbow connectors, on the end surface of the rotary actuator housing 3a near the connection to the stabilizer 1. The axes of rotation of the rotary connections 9, 9a, 9b are preferably parallel to the axis of rotation of the rotary actuator 3 so that the hydraulic lines 11, 11a, 11b are in a plane which is essentially perpendicular to the axis of rotation of the rotary actuator 3. Therefore, generally minimal torsional stresses, and typically no torsional stresses, can occur in the hydraulic lines 11, 11a, 11b since, on the one hand, no hydraulic line 11, 11a, 11b is parallel to the principal axis of the rotary actuator 3 and on the other hand, no torsional moment can accumulate.

FIGS. 4a through 4d illustrate various embodiments of rotational connections 9 for the hydraulic line 11. A graduated hole 42 is preferably worked into the rotary actuator housing 3a. This hole 42 preferably includes one axial guide surface 46 and one radial guide surface 43 for the hydraulic line 11. The connection 9 can preferably be formed by two parts 21 and 21a. Part 21 is the external portion of a locking screw. Part 21a can be inserted into hole 42 towards surface 46. A seal unit 44 can preferably be enclosed inside the radial guide surface 43. The graduated hole 42 of the rotary actuator housing 3a preferably also has a threaded portion 45 into which an axial locking screw 21 can be threaded. The locking screw 21 presses against shoulder 21b of terminal portion 21a to hold the hydraulic line 11 in hole 42. This locking screw 21 rests with the head of the screw on the end surface 47 of the rotary actuator housing 3a. The longitudinal section of the hydraulic line 11 between the axial guide surface 46 of the graduated hole 42 and an axial end surface 47 of the locking screw 21 should preferably be shorter, thus guaranteeing that the hydraulic line 11 remains free to rotate.

Figure 4A:
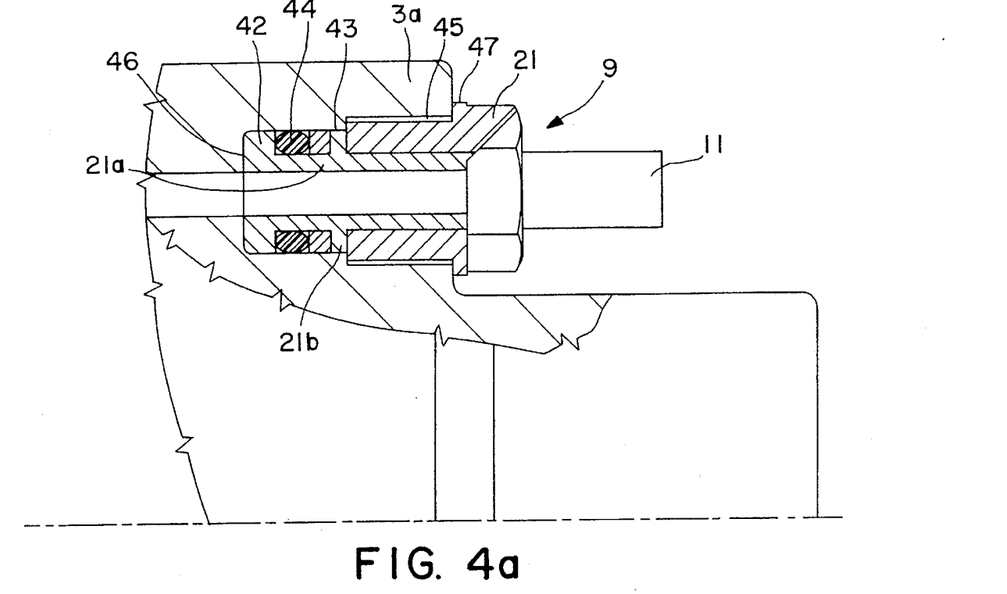
FIGS. 4a, 4b, 4c, and 4d schematically illustrate examples of an angular hydraulic connection.

In other words, the hydraulic line 11 should remain free of any axial compression, allowing it to rotate freely within the locking screw 21. Axial locking screw 21 prevents removal of the hydraulic connectors 9 during operation of the rotary actuator 3.

Figure 4B:
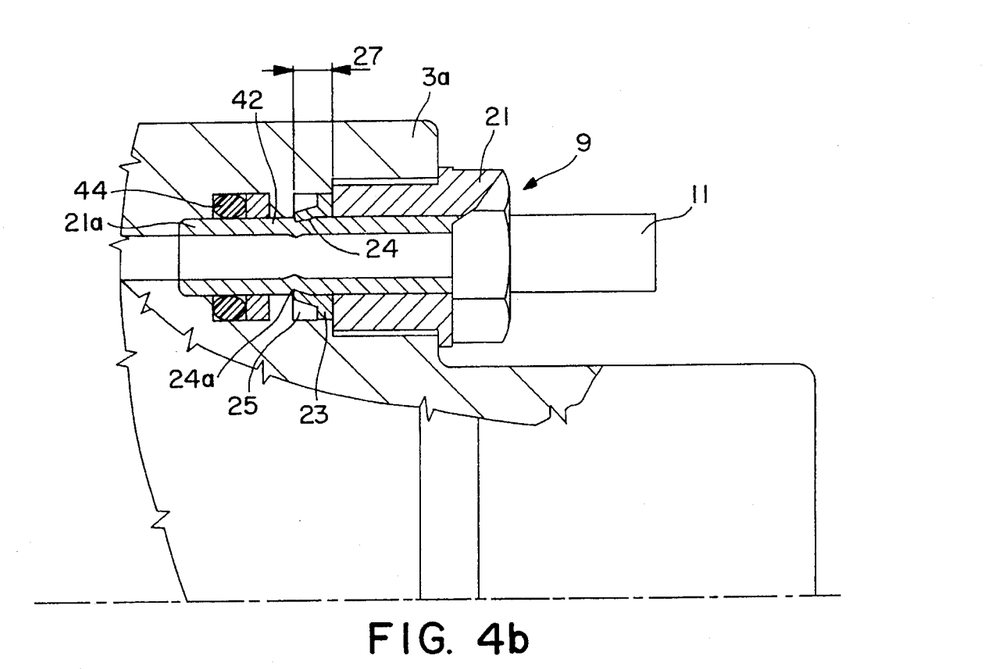

In the variant illustrated in FIG. 4b, an angle ring or internally-bevelled ring 23 is preferably connected by means of a positive interlock 27 to the end of the hydraulic line 11 inserted into the rotary actuator housing 3a. The angle ring 23, by means of its two end faces together with the locking screw 21 and a shoulder 25 of the graduated hole 42, preferably axially fixes the hydraulic line 11, whereby the shoulder 25 has a greater axial extension than the angle ring 23, so that the angle ring 23 generally cannot be permanently distorted by the locking screw 21.

In the embodiment discussed directly above, the end 21a of the hydraulic line 11 is substantially straight with seals 44 disposed inside a groove of the surface 43. End 21a can have a groove to hold ring 23. Ring 23 presses axially against surface 24a of groove 24 to hold the hydraulic line 11 in place.

Figure 4C:
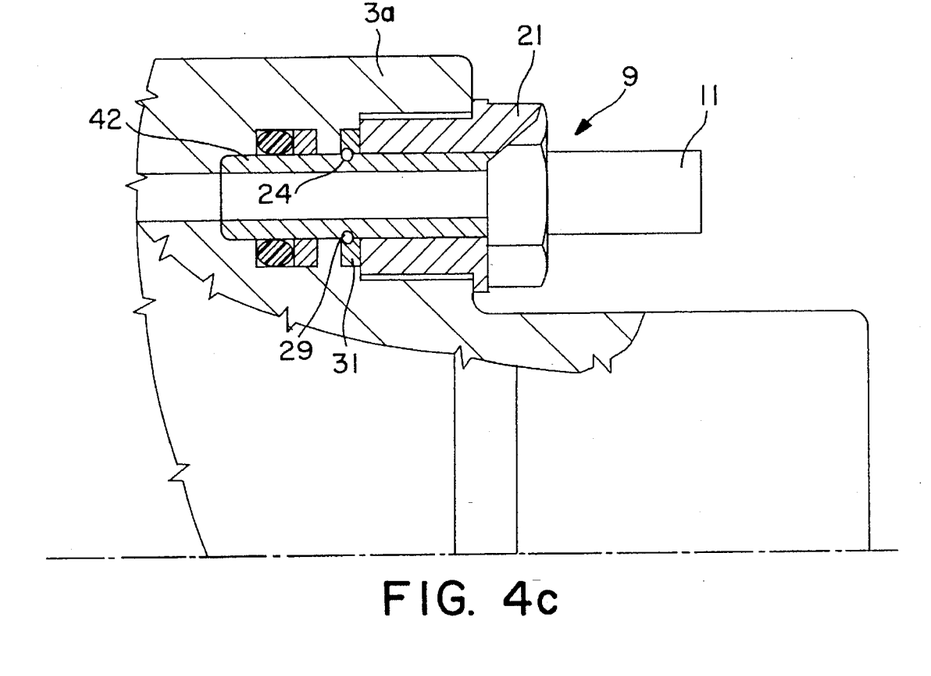

FIG. 4c is essentially identical to the embodiment shown in FIG. 4b. However, instead of an angle ring 23 which is rolled or caulked to the hydraulic line 11, a locking ring 29 together with a retaining ring 31 can preferably be used. The ring 29 can then be engaged in the groove 24, and ring 31 can axially press on ring 29 to hold line 11 in place. The information regarding the axial dimensions of the angle ring 23 as discussed immediately above can also be applied to the retaining ring 31.

Figure 4D:
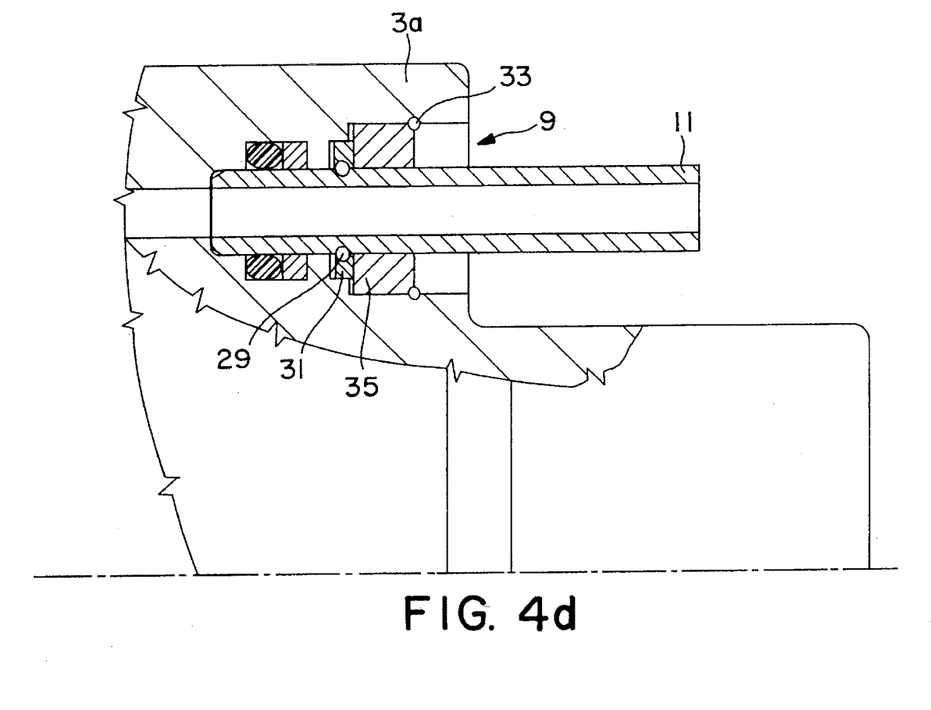

The angular connection 9 illustrated in FIG. 4d is essentially based on the version illustrated in FIG. 4c. However, instead of the locking screw 21, a second snap ring 33 can preferably be used in conjunction with a second retaining ring 35. The snap ring 33 essentially determines the axial position of a second retaining ring 35.

Figure 5:
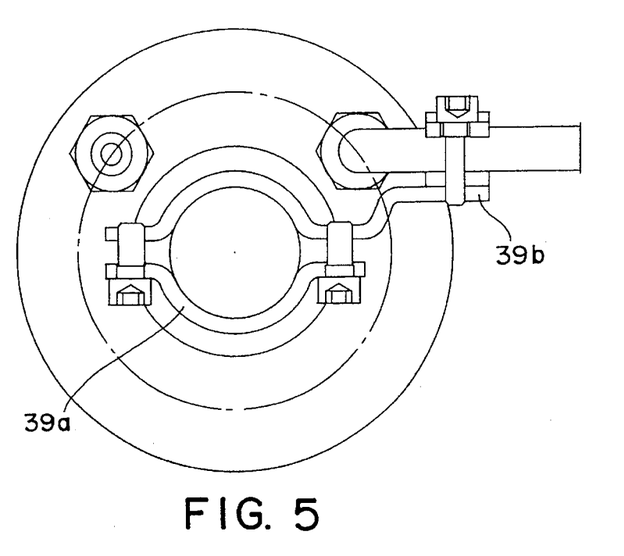
FIGS. 5a and 5 schematically illustrate a hose fastener on the stabilizer part.
Figure 5A:
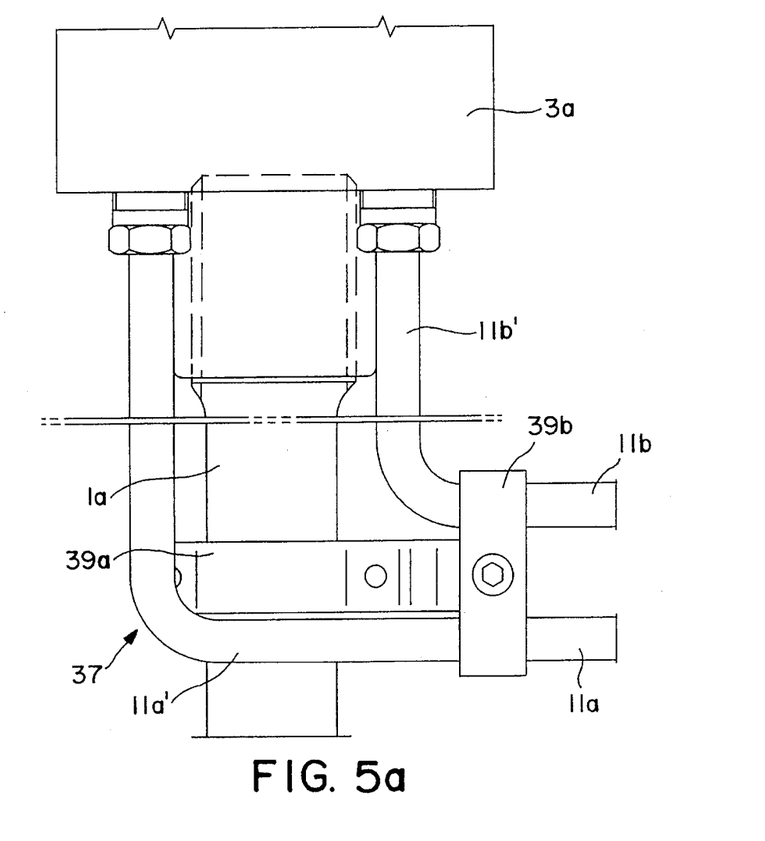
Figure 6:
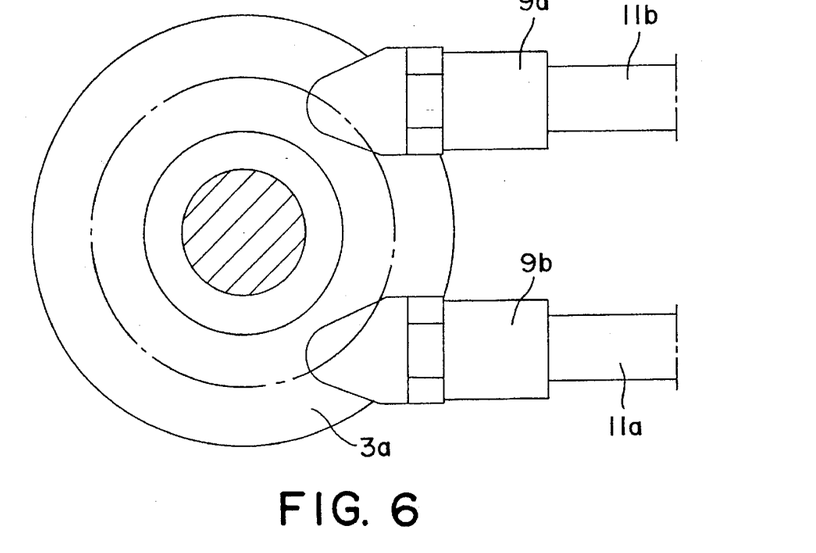
FIGS. 6a and 6 schematically illustrate a non-rotational angular hydraulic connections.
Figure 6A:
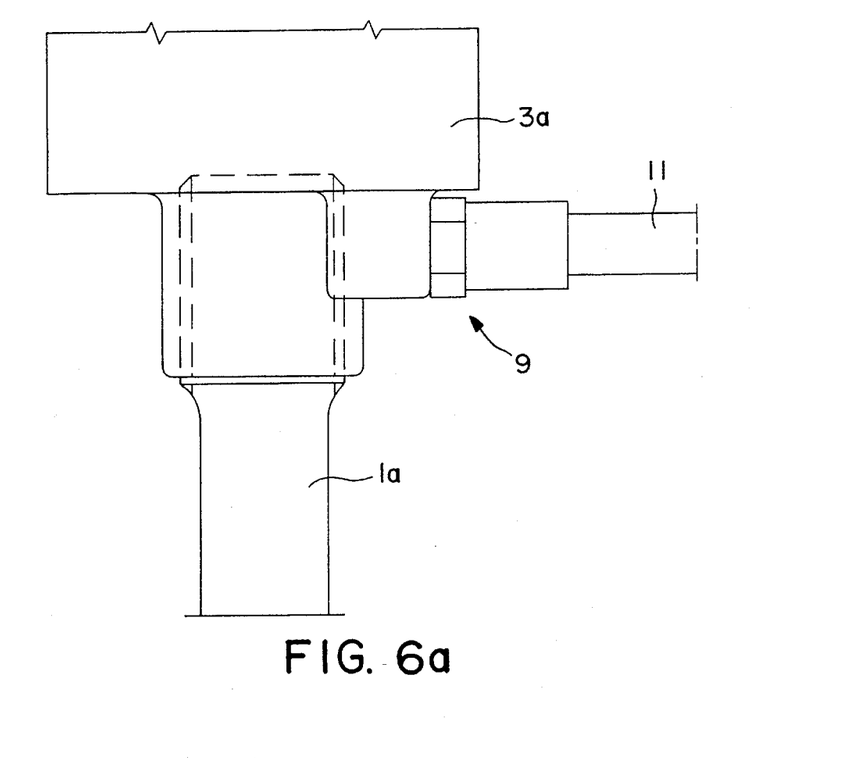

In a further modification of the object of the present invention shown in FIGS. 5 and 5a, a line fastener 37 can preferably be used for the hydraulic line 11a, 11b. This line fastener 37 can preferably be formed by a double pipe clip, the first clip 39a of which can be fastened by means of tightening bolts or turnbuckle screws to the stabilizer part 1a which is preferably stationary with respect to the rotary actuator housing 3a. The second clip 39b can preferably be parallel to the axis of rotation of the rotary actuator so that the clip 39b for the hydraulic line 11a, 11b represents a mounting device which orients the hydraulic line 11a, 11b in a plane which is essentially perpendicular to the axis of rotation. The second clip 39b preferably divides the hydraulic line 11a, 11b into sections 11a', 11a, 11b', 11b, the lengths 11a', 11b' of which are generally not subjected to mechanical loads of any kind, since they are stationary with respect to the stabilizer part 1a and the rotary actuator housing 3a. The longitudinal sections 11a, 11b are generally only subjected to slight bending loads. With the double pipe clip, it is possible to configure this type of rotary actuator housing 3a in such a manner that the hydraulic lines 11 lie in a plane with the hydraulic valve 13a.

With reference to FIGS. 3a, 3b, 4a, 4b, 4c, 4d, 5 and 5a, FIGS. 6 and 6a illustrate, as the simplest solution, an angular connection 9a, 9b which is preferably rigidly connected to the rotary actuator housing 3a. With this embodiment care must be taken that the hydraulic valve 13a (shown in FIG. 1) lies in a plane with the hydraulic connections 9a, 9b. In this variant, too, no torsional load can generally be applied to any twisted length of the hydraulic line 11.

One feature of the invention resides broadly in the hydraulic rotary actuator within a stabilizer system divided into two parts, consisting of a first stabilizer part which is non-rotationally connected to a rotary actuator vane assembly, and a second stabilizer part which is non-rotationally connected to a rotary actuator housing, whereby the rotary actuator housing has hydraulic connections for hydraulic lines which form a flow connection to a hydraulic system, whereby the two stabilizer parts can be rotated with respect to one another by means of the rotary actuator, characterized by the fact that the segments of the hydraulic lines 11a, 11b which are connected to the rotary actuator 3 and are subject to possible deformation are located in a plane which lies essentially perpendicular to the axis of rotation of the rotary actuator 3.

Another feature of the invention resides broadly in the hydraulic rotary actuator characterized by the fact that the hydraulic connections 9a, 9b are oriented essentially perpendicular to the outside surface of the rotary actuator housing 3a.

Yet another feature of the invention resides broadly in the hydraulic rotary actuator characterized by the fact that a ring-type nipple 19 which can be rotated around the axis of rotation of the rotary actuator 3 and which comprises the hydraulic connections 9a, 9b is located on the outside surface.

Still another feature of the invention resides broadly in the hydraulic rotary actuator characterized by the fact that angular connections 9 are located on the end of the rotary motor housing 3a.

A further feature of the invention resides broadly in the hydraulic rotary actuator characterized by the fact that the angular connections 9 are designed so that they can rotate inside the rotary actuator housing 3a.

Another feature of the invention resides broadly in the hydraulic rotary actuator characterized by the fact that the angular connection 9 is formed by a sleeve element of the hydraulic line 11, which sleeve element has bearing surfaces which interact with guide surfaces on the housing and at least one seal unit, whereby an axial fastener 21, 33 supports the hydraulic line 11 against tensile loads.

Yet another feature of the invention resides broadly in the hydraulic rotary actuator characterized by the fact that a line fastener 39a, 39b can be fastened as desired to the rotary actuator housing 3a or to a stabilizer part 1a which is stationary relative to the rotary actuator housing 3a, which line fastener 39a, 39b, by means of a mounting device, divides the hydraulic lines 11 into a stationary 11a', 11b' and a mobile line segment 11a, 11b, whereby the mobile line segment lies in a plane which is essentially perpendicular to the axis of rotation of the rotary actuator 3.

Still another feature of the invention resides broadly in the hydraulic rotary actuator characterized by the fact that the line fastener 39a, 39b consists of a double pipe clip whose individual clips are oriented at right angles to one another.

Some types of automobile suspension systems that could be utilized in accordance with the present invention may be or are disclosed by the following U.S. Pat. Nos.: 5,178,406 to Reynolds, entitled "Torsion Bar Suspension"; 5,286,059 to Tabe, entitled "Height Control System when Vehicle Is Jacked Up"; 5,288,101 to Minnett, entitled "Variable Rate Torsion Control System for Vehicle Suspension"; and 5,290,048 to Takahashi and Yamashita, entitled "Working Fluid Circuit for Active Suspension Control System of Vehicle".

Some types of rotary actuators that could be utilized in accordance with the present invention may be or are disclosed by the following U.S. Pat. Nos.: 5,332,236 to Kastuhara et al., entitled "Sealing Mechanism for a Rotary Actuator"; 5,309,816 to Weyer, entitled "Rotary Actuator with External Bearings"; and 5,267,504 to Weyer, entitled "Rotary Actuator with Annular Fluid Coupling Rotatably Mounted to Shaft".

Some types of rotatable hydraulic motors that could be utilized in accordance with the present invention instead of a rotary actuator 3 may be or are disclosed by the following U.S. Pat. Nos.: 5,181,579 to Gilliem, entitled "Steering and Driving System"; 5,184,466 to Schniederjan and Wagenseil, entitled "Control and Regulating Device for a Hydrostatic Transmission"; 5,265,995 to Beck, entitled "Tractor-loader Backhoe"; 5,207,550 to Lehman, entitled "Drum Handler"; 5,314,387 to Hauser and Johnson, entitled "Hydrostatic Transmission"; and 5,197,283 to Kagiwada and Yasuoka, entitled "Hydraulic-motor Drive Circuit System with Anticavitation Control".

Some types of hydraulic piston motors that could be utilized in accordance with the present invention instead of a rotary actuator or rotatable hydraulic motor may be or are disclosed by the following U.S. Pat. Nos.: 5,182,977 to Gulbrantson, entitled "Hydraulic Centrifugal Piston Motor"; 5,203,172 to Simpson and Bisel, entitled "Electromagnetically Powered Hydraulic Engine"; 5,222,427 to Molitorisz, entitled "Axial Piston Hydraulic Motor"; and 5,249,512 to Christenson, entitled "Hydrostatic Pump and Motor".

Some types of hydraulic valves that could be utilized in accordance with the present invention may be or are disclosed by the following U.S. Pat. Nos.: 5,331,883 to Andersson, entitled "Hydraulic Valve Means"; 5,325,891 to Mateja, entitled "Hydraulic Valve"; 5,255,704 to Bennett, entitled "Leakproof Hydraulic Valve"; 5,238,020 to Frey and Plangger, entitled "Hydraulic Valve"; 5,207,780 to Norimatsu et al., entitled "Hydraulic Valve Device for Automotive Power Steering Gear"; and 5,222,521 to Kihlberg, entitled "Hydraulic Valve".

Some types of ring-type nipple connectors that could be utilized in accordance with the present invention may be or are disclosed in the following U.S. Pat. Nos.: 5,193,857 to Kitamura, entitled "Connector"; 5,195,788 to Oetiker, entitled "Insert Member for Use with Hose Clamp Arrangements"; and 5,226,677 to Peter and Timm, entitled "Rotary Joint with Extended Life Seal".

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 37 821.8, filed on Nov. 5, 1993, having inventors Robert PRADEL and Stefan SCHIFFLER, and DE-OS P 43 37 821.8 and DE-PS P 43 37 821.8, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are accurate and to scale and are hereby included by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A vehicular suspension system comprising:

a hydraulic rotary actuator;

said rotary actuator comprising a first member and a second member;

at least one of said first member and said second member being rotatable with respect to the other of said first member and said second member;

means for rotating, with hydraulic fluid pressure, at least one of said first member and said second member with respect to the other of said first member and said second member;

said at least one of said first member and said second member being rotatable about an axis of rotation;

a first stabilizer bar;

a second stabilizer bar;

said first stabilizer bar being attached to said first member;

said second stabilizer bar being attached to said second member;

means for connecting hydraulic lines to one of said first member and said second member to provide hydraulic fluid pressure to said rotary actuator;

said means for connecting comprising means for minimizing twisting, during relative rotation between said first member and said second member, of hydraulic lines along the length of hydraulic lines being connected to one of said first member and said second member;

said means for minimizing twisting of hydraulic lines connected to one of said first member and said second member comprising hydraulic connectors for connecting hydraulic lines to one of said first member and said second member;

said means for minimizing twisting of hydraulic lines connected to one of said first member and said second member further comprising a rotatable fitting for directing hydraulic fluid to and from said means for rotating;

said rotatable fitting comprising means for rotating about said axis of rotation;

said rotatable fitting being disposed about and rotates relative to at least one of said first member and said second member;

said hydraulic connectors forming part of said rotatable fitting;

said rotatable fitting maintaining said hydraulic connectors substantially stationary with respect to themselves during actuation of said rotary actuator;

said rotary actuator having a central portion disposed about said axis of rotation;

said hydraulic connectors extending substantially outwardly away from said central portion;

said hydraulic connectors comprising a first hydraulic connector and a second hydraulic connector;

said first hydraulic connector having a longitudinal axis;

a length of a connected hydraulic line being substantially alignable with said longitudinal axis of said first hydraulic connector;

said longitudinal axis of said first hydraulic connector being substantially disposed in a first plane substantially transverse to said axis of rotation;

said second hydraulic connector having a longitudinal axis;

a length of a connected hydraulic line being substantially alignable with said longitudinal axis of said second hydraulic connector; and said longitudinal axis of said second hydraulic connector being substantially disposed in a second plane substantially transverse to said axis of rotation.

2. The vehicular suspension system according to claim 1 wherein said first plane is substantially coincident with said second plane.

3. The vehicular suspension system according to claim 2 wherein:

said first member of said rotary actuator comprises shaft means;

said second member of said rotary actuator comprises cylinder means;

said cylinder means and said shaft means are disposed to rotate about said axis of rotation;

said shaft means is at least substantially disposed within said cylinder means;

said cylinder means is disposed to rotate substantially concentrically about said shaft means;

said rotatable fitting is disposed about said cylinder means; and said rotatable fitting comprises means for rotating said rotatable fitting substantially freely with respect to said cylinder means.

4. The vehicular suspension system according to claim 3 including:

means for connecting said first stabilizer bar and said second stabilizer bar to wheel assemblies of a motor vehicle;

means for fastening said automobile suspension system to a motor vehicle;

a hydraulic system for providing hydraulic fluid to operate said rotary actuator;

said hydraulic system comprising a hydraulic pump for pumping hydraulic fluid;

said hydraulic system further comprising a hydraulic value for regulating the flow of hydraulic fluid;

means for connecting said first stabilizer bar to said first member;

means for connecting said second stabilizer bar to said second member;

bellow sleeves for protecting said means for connecting said first stabilizer bar and said first member and said means for connecting said second stabilizer bar and said second member;

said rotary actuator comprising seals to prevent leakage of hydraulic fluid during operation of said rotary actuator;

said hydraulic connectors comprising means for sealing hydraulic fluid and means for preventing removal of said hydraulic connectors during operation of said rotary actuator;

said hydraulic connectors comprising a guide surface for receiving hydraulic lines;

said guide surface comprising a threaded surface for accepting a threaded screw; and said hydraulic connectors further comprise a locking screw for threading into said threaded surface to prevent removal of said hydraulic connectors during operation of said rotary actuator.

5. A vehicular suspension system comprising:

a hydraulic rotary actuator;

said rotary actuator comprising a first member and a second member;

at least one of said first member and said second member being rotatable with respect to the other of said first member and said second member;

means for rotating, with hydraulic fluid pressure, at least one of said first member and said second member with respect to the other of said first member and said second member;

said at least one of said first member and said second member being rotatable about an axis of rotation;

a first stabilizer bar;

a second stabilizer bar;

said first stabilizer bar being attached to said first member;

said second stabilizer bar being attached to said second member;

means for connecting hydraulic lines to one of said first member and said second member to provide hydraulic fluid pressure to said rotary actuator;

said means for connecting comprising means for minimizing twisting, during relative rotation between said first member and said second member, of hydraulic lines along the length of hydraulic lines being connected to one of said first member and said second member;

said means for minimizing twisting of hydraulic lines connected to one of said first member and said second member comprising means for providing movement of hydraulic lines, connected to one of said first member and said second member, substantially solely in a plane transverse to said axis of rotation during actuation of said rotary actuator;

said means for providing movement of hydraulic lines, connected to one of said first member and said second member, comprising at least one hydraulic connector for connecting hydraulic lines to one of said first member and said second member;

said at least one hydraulic connector being swivellable about a first axis;

said first axis being disposed through said at least one hydraulic connector and substantially parallel to said axis of rotation;

said at least one hydraulic connector comprising a second axis;

said second axis being disposed transverse to said first axis of the corresponding at least one hydraulic connector;

said at least one hydraulic connector comprising two openings permitting the flow, of hydraulic fluid through said at least one hydraulic connector in a direction along said first axis and said second axis;

said at least one hydraulic connector being connected to one of said first member and said second member to provide hydraulic fluid to said rotary actuator; and said at least one hydraulic connector comprising means for connecting hydraulic lines to said at least one hydraulic connector and maintaining alignment of at least a portion of the hydraulic lines with said second axis.

6. The vehicular suspension system according to claim 5 wherein:

said one of said first member and said second member comprises means for receiving said at least one hydraulic connector; and said at least one hydraulic connector comprises means for rotatably maintaining a connection from an hydraulic line within said at least one hydraulic connector.

7. The vehicular suspension system according to claim 6 including:

means for connecting said first stabilizer bar and said second stabilizer bar to wheel assemblies of a motor vehicle;

means for fastening said automobile suspension system to a motor vehicle;

a hydraulic system for providing hydraulic fluid to operate said rotary actuator;

said hydraulic system comprising a hydraulic pump for pumping hydraulic fluid;

said hydraulic system further comprising a hydraulic valve for regulating the flow of hydraulic fluid;

means for connecting said first stabilizer bar to said first member;

means for connecting said second stabilizer bar to said second member;

bellow sleeves for protecting said means for connecting said first stabilizer bar and said first member and said means for connecting said second stabilizer bar and said second member;

said rotary actuator comprising seals to prevent leakage of hydraulic fluid during operation of said rotary actuator;

said at least one hydraulic connector comprising means for sealing hydraulic fluid and means for preventing removal of said at least one hydraulic connector during operation of said rotary actuator;

said at least one hydraulic connector comprising a guide surface for receiving at least one hydraulic line;

said guide surface comprising a threaded surface for accepting a threaded screw; and said at least one hydraulic connector further comprises a locking screw for threading into said threaded surface to prevent removal of said at least one hydraulic connector during operation of said rotary actuator.

8. A vehicular suspension system comprising:

a hydraulic rotary actuator;

said rotary actuator comprising a first member and a second member;

at least one of said first member and said second member being rotatable with respect to the other of said first member and said second member;

means for rotating, with hydraulic fluid pressure, at least one of said first member and said second member with respect to the other of said first member and said second member;

said at least one of said first member and said second member being rotatable about an axis of rotation;

a first stabilizer bar;

a second stabilizer bar;

said first stabilizer bar being attached to said first member;

said second stabilizer bar being attached to said second member;

means for connecting hydraulic lines to one of said first member and said second member to provide hydraulic fluid pressure to said rotary actuator;

said means for connecting comprising means for minimizing twisting, during relative rotation between said first member and said second member, of hydraulic lines along the length of hydraulic lines being connected to one of said first member and said second member;

said means for minimizing twisting of hydraulic line connected to one of said first member and said second member comprising means for providing movement of hydraulic lines, connected to one of said first member and said second member, substantially solely in a plane transverse to said axis of rotation during actuation of said rotary actuator;

said means for minimizing twisting comprising:

a clamp;

said clamp being connected to a portion of said automobile suspension system that remains substantially stationary relative to one of said first member and said second member;

a first hydraulic line for permitting the flow of hydraulic fluid;

said first hydraulic line comprising a first portion and a second portion;

a second hydraulic line;

said second hydraulic line comprising a first portion and a second portion;

said clamp comprising means for attaching said first hydraulic line and disposing said first portion of said first hydraulic line in a plane transverse to said axis of rotation; and said clamp comprising means for attaching said second hydraulic line and disposing said first portion of said second hydraulic line in a plane transverse to said axis of rotation.

9. The vehicular suspension system according to claim 8 including:

a first hydraulic connector comprising means for connecting said first hydraulic line to one of said first member and said second member;

a second hydraulic connector comprising means for connecting said second hydraulic line to one of said first member and said second member;

said second portion of said first hydraulic line being disposed between said clamp and said first hydraulic connector;

said second portion of said second hydraulic line being disposed between said clamp and said second hydraulic connector; and said second portion of said first hydraulic line and said second portion of said second hydraulic line remaining substantially stationary with respect to one of said first member and said second member during actuation of said rotary actuator.

10. The vehicular suspension system according to claim 9 wherein said clamp is connected to one of said first member and said second member.

11. The vehicular suspension system according to claim 10 wherein:

said first member of said rotary actuator comprises shaft means;

said second member of said rotary actuator comprises cylinder means;

said cylinder means and said shaft means are disposed to rotate relative to one another about said axis of rotation;

said shaft means is at least substantially disposed within said cylinder means;

said cylinder means is disposed to rotate substantially concentrically about said shaft means; and said clamp is connected to said cylinder means.

12. The vehicular suspension system according to claim 9 wherein said clamp is connected to one of said first stabilizer bar and said second stabilizer bar.

13. The vehicular suspension system according to claim 12 including:

means for connecting said first stabilizer bar and said second stabilizer bar to wheel assemblies of a motor vehicle;

means for fastening said automobile suspension system to a motor vehicle;

a hydraulic system for providing hydraulic fluid to operate said rotary actuator;

said hydraulic system comprising a hydraulic pump for pumping hydraulic fluid;

said hydraulic system further comprising a hydraulic valve for regulating the flow of hydraulic fluid;

means for connecting said first stabilizer bar to said first member;

means for connecting said second stabilizer bar to said second member;

bellow sleeves for protecting said means for connecting said first stabilizer bar and said first member and said means for connecting said second stabilizer bar and said second member;

said rotary actuator comprising seals to prevent leakage of hydraulic fluid during operation of said rotary actuator;

hydraulic connectors comprising means for sealing hydraulic fluid and means for preventing removal of said hydraulic connectors during operation of said rotary actuator;

said hydraulic connectors comprising a guide surface for receiving hydraulic lines;

said guide surface comprising a threaded surface for accepting a threaded screw; and said hydraulic connectors further comprises a locking screw for threading into said threaded surface to prevent removal of said at least one hydraulic connector during operation of said rotary actuator.

14. A vehicular suspension system comprising:

a hydraulic rotary actuator;

said rotary actuator comprising a first member and a second member;

at least one of said first member and said second member being rotatable with respect to the other of said first member and said second member;

means for rotating, with hydraulic fluid pressure, at least one of said first member and said second member with respect to the other of said first member and said second member; p1 said at least one of said first member and said second member being rotatable about an axis of rotation;

a first stabilizer bar;

a second stabilizer bar;

said first stabilizer bar being attached to said first member;

said second stabilizer bar being attached to said second member;

means for connecting hydraulic lines to one of said first member and said second member to provide hydraulic fluid pressure to said rotary actuator;

said means for connecting comprising means for minimizing twisting, during relative rotation between said first member and said second member, of hydraulic lines along the length of hydraulic lines being connected to one of said first member and said second member;

said means for minimizing twisting of hydraulic lines connected to one of said first member and said second member comprising means for providing movement of hydraulic lines, connected to one of said first member and said second member, substantially solely in a plane transverse to said axis of rotation during actuation of said rotary actuator;

said means for providing movement of hydraulic lines, connected to one of said first member and said second member, comprising at least one hydraulic connector for connecting hydraulic lines to one of said first member and said second member;

said at least one hydraulic connector comprising a first axis;

said first axis being disposed through said at least one hydraulic connector and substantially parallel to said axis of rotation;

said at least one hydraulic connector comprising a second axis;

said second axis being disposed transverse to said first axis of the corresponding at least one hydraulic connector;

said at least one hydraulic connector comprising two openings permitting the flow of hydraulic fluid through said at least one hydraulic connector in a direction along said first axis and said second axis;

said at least one hydraulic connector being connected to one of said first member and said second member to provide hydraulic fluid to said rotary actuator;

said at least one hydraulic connector comprising means for connecting hydraulic lines to said at least one hydraulic connector and maintaining alignment of at least a portion of the hydraulic lines with said second axis;

said at least one hydraulic connector being non-rotatably connected to one of said first member and said second member;

one of said first member and said second member comprising an outer surface disposed furthest away from said axis of rotation;

said axis of rotation being disposed away from said first axis by a first distance;

said axis of rotation being disposed away from said outer surface by a second distance;

said at least one hydraulic connector comprising two hydraulic connectors; and said second distance being substantially greater than said first distance and thus minimizes total movement of hydraulic lines connected to said hydraulic connectors.

15. The vehicular suspension system according to claim 14 including:

means for connecting said first stabilizer bar and said second stabilizer bar to wheel assemblies of a motor vehicle;

means for fastening said automobile suspension system to a motor vehicle;

a hydraulic system for providing hydraulic fluid to operate said rotary actuator;

said hydraulic system comprising a hydraulic pump for pumping hydraulic fluid;

said hydraulic system further comprising a hydraulic valve for regulating the flow of hydraulic fluid;

means for connecting said first stabilizer bar to said first member;

means for connecting said second stabilizer bar to said second member;

bellow sleeves for protecting said means for connecting said first stabilizer bar and said first member and said means for connecting said second stabilizer bar and said second member;

said rotary actuator comprising seals to prevent leakage of hydraulic fluid during operation of said rotary actuator;

said at least one hydraulic connector comprising means for sealing hydraulic fluid and means for preventing removal of said at least one hydraulic connector during operation of said rotary actuator;

said at least one hydraulic connector comprising a guide surface for receiving at least one hydraulic line;

said guide surface comprising a threaded surface for accepting a threaded screw; and said at least one hydraulic connector further comprises a locking screw for threading into said threaded surface to prevent removal of said at least one hydraulic connector during operation of said rotary actuator.

* * * * *

UNITED STATES PATENT AND TRADEMARK OFFICE
CERTIFICATE OF CORRECTION

PATENT NO. : 5,580,079
DATED : December 3, 1996
INVENTOR(S) : Robert PRADEL and Stefan SCHIFFLER It is certified that error appears in the above-indentified patent and that said Letters Patent is hereby corrected as shown below:

In column 3, line 19, after '9a,', delete "9bwhich" and insert --9b which--.

In column 9, line 33, Claim 4, before 'for', delete "value" and insert --valve--.

In column 11, line 61, Claim 8, after 'hydraulic', delete "line" and insert --lines--.

In column 13, line 44, Claim 14, after the first occurrence of 'member;' delete "pl".

Signed and Sealed this

Fifteenth Day of April, 1997

Attest:

BRUCE LEHMAN

Attesting Officer

Commissioner of Patents and Trademarks